United States Patent [19]

Himelstein

[11] Patent Number: 4,663,616

[45] Date of Patent: May 5, 1987

[54] ATTACHMENT OF LINES TO OBJECTS IN INTERACTIVE DRAW GRAPHICS

[75] Inventor: Carol S. Christensen, Travis County, Tex.

[73] Assignee: International Business Machines Corp., Armonk, N.Y.

[21] Appl. No.: 748,590

[22] Filed: Jun. 25, 1985

[51] Int. Cl.$^4$ .............................................. G09G 3/02
[52] U.S. Cl. .................................... 340/724; 340/747
[58] Field of Search ............... 340/707, 709, 710, 723, 340/724, 727, 751, 747; 364/512, 521

[56] References Cited

U.S. PATENT DOCUMENTS

| | | | |
|---|---|---|---|
| Re. 31,200 | 4/1983 | Sukonick et al. | 340/725 X |
| 3,846,826 | 11/1974 | Mueller | 340/710 X |
| 3,882,446 | 5/1975 | Brittian et al. | 340/365 R X |
| 4,392,130 | 7/1983 | Lundström et al. | 340/747 |
| 4,451,895 | 5/1984 | Sliwkowski | 340/794 X |

OTHER PUBLICATIONS

*The Lisa Computer System*, Gregg Williams, Byte Publications, Inc., Feb. 1983, pp. 33-50.

Primary Examiner—Gerald L. Brigance
Assistant Examiner—Vincent P. Kovalick
Attorney, Agent, or Firm—C. Lamont Whitham

[57] ABSTRACT

A technique is provided the user of an interactive computer graphics application which allows the user to attach lines to objects such that when the objects move, the lines will rubber-band to follow the object. The objects are provided with an attribute that describes their "stickiness". If an object is given the "sticky" attribute, then lines which touch or overlay the object will rubber-band to follow the object's movement. It is also possible to provide end points of lines with the "sticky" attribute so that the end points of lines can be attached to objects. Further, objects of arbitrary geometric shape can be attached to other objects of arbitrary geometric shape using the "sticky" attribute. The feature facilitates editing and revision of graphic files.

3 Claims, 4 Drawing Figures

ATTACHMENT OF LINES TO OBJECTS IN INTERACTIVE DRAW GRAPHICS

FIELD OF THE INVENTION

The present invention generally relates to interactive computer graphics applications and, more particularly, to a technique for a user of such applications to attach lines to objects such that when the objects are moved, the lines will rubberband and follow the object.

DESCRIPTION OF THE PRIOR ART

Computer aided drafting or design (CAD) and computer aided manufacturing (CAM) systems are in wide spread use. Their application is diverse and ranges from architectual design to the design of masks for integrated circuits and from the assembly of automobiles to the production of pharmaceuticals. While these systems have greatly increased productivity in those areas where they have been employed, the efficiency of their use is a function of their interface with the user and the number of repetitious procedures the user is required to perform.

In the specific area of CAD systems, there are situations which require the user to invoke procedures such as erase and redraw or move lines when a previously drawn object is moved. Consider for example an engineering application in which the user is performing logic design. The user may have drawn a number of logic gates and other devices on the computer display screen using the CAD application. These gates and devices will have lines connected to their input and output terminals. Should the user in the course of the logic design decide to move one of the gates or devices, which is a function supported by many CAD applications, the result is that the lines that were previously connected to the input and output terminals remain in their original position. As a result, it is necessary for the user to reposition the lines corresponding to the new location of the logic gate or device. This may be done by various techniques but in all instances requires several additional steps to be performed by the user.

The engineering application just described is but one of many applications where this problem is encountered. Another example is in the architectual design of a large office building where, due to a design change or other reason, it is necessary for the user to move a switch. It would be desirable in that situation for the wires that are connected to that switch to move with the switch so that they do not have to be separately moved or redrawn. Thus, there is need for a technique that allows the user to attach lines to objects in an interactive computer graphics application that will cause the lines so attached to move with the objects when they are moved.

SUMMARY OF THE INVENTION

It is therefore an object of this invention to provide a technique for an interactive computer graphic application wherein lines which are attached to an object move with the object.

It is another object of the invention to provide a means for the user of an interactive computer graphic application to attach lines to objects such that when the objects move, the lines will rubber-band and follow the object.

According to the invention, objects are given an attribute that will describe their "stickiness". When the user selects an object and then selects a DESCRIBE action, s/he is given the option of making the object "sticky" or not "sticky". If the object is given the "sticky" attribute, then a line will "stick to" the object it touches or overlays. Whenever the object that the line is stuck to is moved, the line will "rubber-band" and follow that object's movement. The term "rubber-band" is a term well recognized in the CAD art and describes a line drawing technique wherein one end of the line is fixed and the other end follows a draw cursor on the screen until it is fixed by command. At that time, the line is drawn taut, like a stretched rubber band. If the user does not give the object the "sticky" attribute, then the endpoints of lines previously touching or overlaying the object will remain where they were originally placed no matter what happens to the objects they originally touched. Thus, the user has at his or her command the option to provide an object with the "sticky" attribute so that lines which touch or overlay the object will move with the object.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF THE PREFERRED EMBODIMENT OF THE INVENTION

Figure 1:
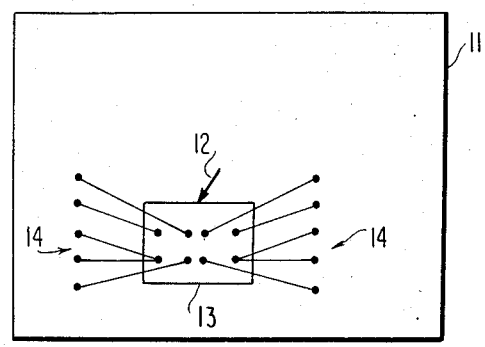
FIG. 1 is an illustration of a computer graphics screen showing an object to which a plurality of lines are attached.

Referring now to the drawings, and more particularly to FIG. 1, there is illustrated a window 11 which is assumed to be displayed on an all points addressable (APA) or bit-mapped screen, such as a cathode ray tube (CRT) screen, of a device controlled by a stand alone or host connected computer workstation or system. Display and control of the window 11 can by by means of an application program useable by the workstation.

When operation is within the window, the point of operation is denoted by the cursor 12, as shown in FIG. 1. As cursor 12 is moved by a locator device, the point of operation is moved. The cursor locator device can be a mouse, joystick, keyboard, digitizer or the like. The particular cursor locator device used is unimportant as far as this invention is concerned. Cursor location and movement are directly related to editing, and editing encompasses the operations of insertion, deletion, replacement, move and so forth. Of course, it is to be appreciated that there are instances where editing can be accomplished independently of cursor location and motion as well.

Figure 2:
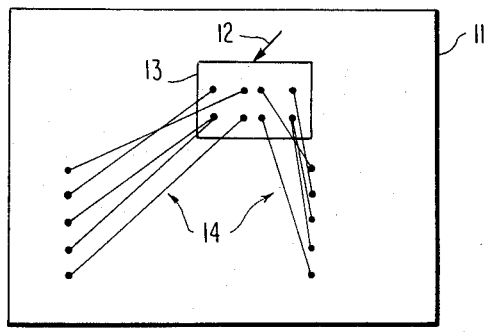
FIG. 2 is an illustration of the same computer graphics screen showing the result of moving the object when the ends of the lines touching the object have the "sticky" attribute.

As shown in FIG. 1, box 13 is a graphic object with ten different lines attached. The lines are generally denoted by the reference numeral 14. In FIG. 2, the user has selected to move the box 13 to a new location within the window. This would be accomplished by positioning the cursor 12 on the box 13 and invoking the MOVE command and then "dragging" the box to the new location by moving the cursor. This is a function well known in CAD systems and need not be described in any greater detail for a proper understanding of the invention. As shown in FIG. 2, the box was provided with the "sticky" attribute according to the invention, and as a result, the lines touching or overlying it followed the box to its new location.

Figure 3:
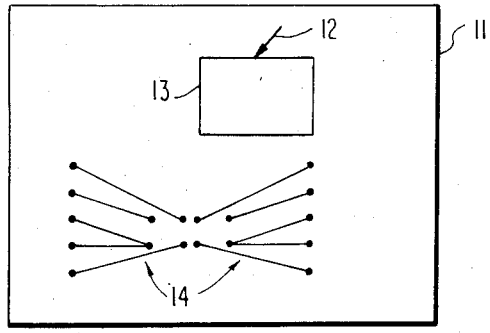
FIG. 3 is an illustration of the computer graphics screen showing the result of moving the object when the ends of the lines toucing the object do not have the "sticky" attribute.

In contrast, consider the situation shown in FIG. 3 where the box 13 is again moved to a new location from its original location in FIG. 1. In this case, however, the box was not given the "sticky" attribute. For this reason, the lines do not follow the box as it is moved around the window but instead remain in their original positions.

The following is the pseudocode listing of the procedure for "sticky" objects according to the invention. This is a high level code written in program design language (PDL) from which source and object code can be readily derived by a programmer skilled in the art.

```
REPEAT
CALL READ_INPUT_DEVICE (SELECT_KEY_TYPE,
X,Y)
IF (SELECT_KEY_TYPE =
OBJECT_SELECT_KEY) THEN
CALL DESELECT_PREVIOUS_OBJECT
OBJECT = GET_OBJECT (X,Y)
CALL SELECT_GRAPHIC_OBJECT (OBJECT)
ELSE
IF (SELECT_KEY_TYPE =
ACTION_SELECT_KEY) THEN
IF OBJECT_SELECTED THEN
ACTION = GET_ACTION (X,Y)
CASE ACTION OF
DESCRIBE:
QUERY_USER ('Set or Reset "Sticky"
attribute', STICKY_ATTRIBUTE)
MOVE, ROTATE, STRETCH, SHRINK:
IF STICKY_OBJECTS_ATTACHED (OBJECT)
THEN
REPEAT
READ_INPUT_DEVICE (SELECT_KEY_
TYPE, X,Y)
EXECUTE_ACTION (OBJECT, ACTION,
X,Y)
RUBBERBAND_STICKY_OBJECTS (OBJECT)
UNTIL SELECT_KEY_TYPE = ACTION_
COMPLETE
ELSE
REPEAT
READ_INPUT_DEVICE (SELECT_KEY_
TYPE, X,Y)
EXECUTE_ACTION (OBJECT, ACTION,
X,Y)
UNTIL SELECT_KEY_TYPE = ACTION_
COMPLETE
ENDIF
OTHERWISE
REPEAT
READ_INPUT_DEVICE (SELECT_KEY_TYPE,
X,Y)
EXECUTE_ACTION (OBJECT, ACTION, X,Y)
UNTIL SELECT_KEY_TYPE = ACTION_
COMPLETE
ENDCASE
ENDIF
ENDIF
UNTIL SELECT_KEY_TYPE = TERMINATE
```

In the following description of the pseudocode, is is assumed that the workstation is under mouse and keyboard device control. The mouse controls the movement of a visible pointing cursor which allows the operator to determine the current cursor position on the screen. The mouse is also assumed to have two keys or buttons. One of these keys is used for selection of objects and menu options and is called the OBJECT_SELECT_KEY, and the other is used for requesting menu presentation and is called the ACTION_SELECT_KEY.

The application calls for a routine to query the mouse input device to determine if a mouse key has been pressed (CALL READ_INPUT_DEVICE). READ_INPUT_DEVICE will return the type of selection the user has requested and the current X,Y location of the cursor on the screen. If the OBJECT_SELECT_KEY has been pressed, then a routine is called to deselect any previous graphic object that was selected. The GET_OBJECT function is called to determine which graphic object was selected given the current cursor location. The OBJECT returned from GET_OBJECT is then highlighted and remembered as the selected object in SELECT_GRAPHIC_OBJECT.

If the ACTION_SELECT_KEY has been pressed, then OBJECT_SELECTED is called to determine if there is already an object selected. If there is an object already selected, then GET_ACTION is called to determine which action was selected given the current cursor position. Slightly different procedures will be followed depending on the action selected. If the action was the DESCRIBE action, then the system queries the user for the "sticky" object attribute. The user can either set the object to be "sticky" or not "sticky". QUERY_USER will return the user's response in STICKY_ATTRIBUTE.

If the action selected by the user was MOVE, ROTATE, STRETCH, or SHRINK, then STICKY_OBJECTS_ATTACHED is called to determine if the selected object has any "sticky" objects attached to it. If there are "sticky" objects attached, then the interactive action loop calls READ_INPUT_DEVICE to access the current cursor position, the EXECUTE_ACTION to do an iterative step of the action, and finally the RUBBERBAND_STICKY_OBJECTS to rubberband each "sticky" object to stay attached to the selected object. The rest of the vertices remain fixed. If there are no "sticky" objects attached to the selected object, then the interactive action loop is the same as before but without the rubberbanding. If the action selected was not an action that required that the object move, rotate, or change size, then the interactive loop is the same again but without the rubberbanding of "sticky" objects. All the interactive action loops remain in effect until the user signals an end to the action (usually by releasing the select key).

The user can terminate the process set out in the pseudocode by pressing an END key on the keyboard or leaving the graphic object set area. In the particular environment where the preferred embodiment of the invention is used, the user of an interactive document editing program can create graphic pictures within a document. Each of these pictures is referred to as an object set. To access any portion of the object set or the object set itself, the user must move the pointing cursor with the locator device to the objects or object set s/he wants selected and press the select key. This tells the system that any ensuing action will be done on that object.

Figure 4:
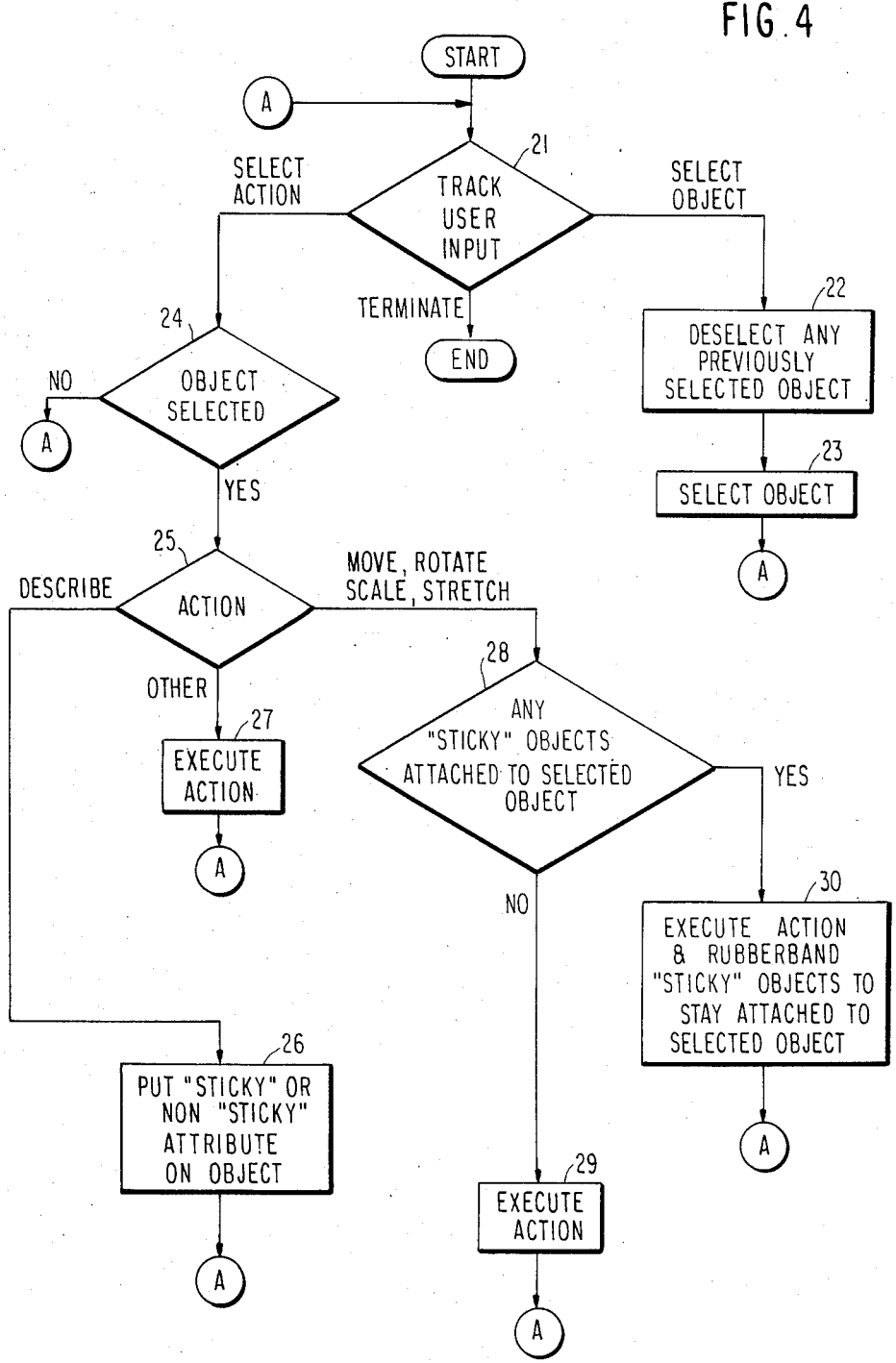
FIG. 4 is a flow chart showing the operation of the technique which provides the ends of lines with the "sticky" attribute according to the invention.

The flow chart shown in FIG. 4 assumes that the object set has already been created and that the user is moving the pointing cursor around the visible document area in anticipation of selecting something. Decision block 21 indicates that the system is tracking the user's input. The user can select one of three things at this point; s/he can select an action, s/he can select an object, or s/he can terminate graphics processing. If the user selects a graphic object, then in block 22 any previously selected object will be deselected. The selected object will then be highlighted and the data structure that remembers what is selected is updated in block 23.

If the user selects an action, then the system checks to be sure an object is already selected in decision block 24. If not, then control returns to decision block 21. Otherwise, the system checks the action requested in decision block 25. If the action is DESCRIBE, then the system lets the user define the object as either "sticky" or not "sticky" in block 26. This attribute will stay with the object either until the object is deleted or until the user changes the attribute through the DESCRIBE action again.

If the action selected by the user is not one that changes the position, orientation or size of the object, then the action is done on the object without any further checks as indicated in block 27. If, however, the action is one of these types, then a check must be made in decision block 28 to see if any "sticky" objects are touching the selected object. Actually, in the embodiment being described, the object is checked to first determine if it has the "sticky" attribute, and if it does, a check is made to determine if any lines touch or overlay the object, these lines being the "sticky" objects. If there are no "sticky" objects, then the action is executed normally as indicated by block 29. However, if there are "sticky" objects touching the selected object, then as the action is performed on the selected object, all attached "sticky" objects must rubberband to remain attached at the same position as indicated by block 30. Any vertices of the "sticky" object which lie outside the selected object will remain fixed as the rest of it rubberbands. Once execution of the action is complete, control returns to decision block 21. The system continues with the steps illustrated in the flow chart until the user terminates the editing process while in block 21.

While the invention has been described in terms of a preferred embodiment, those skilled in the art will recognize that modifications and changes can be made within the spirit and scope of the invention. For example, the preferred embodiment has been described in terms of providing the "sticky" attribute to an object such as a box or other arbitrary geometric shape. Alternatively, the "sticky" attribute can just as easily be applied to a line end which touches an object so as to cause the line end to follow the object should it be moved. Moreover, the "sticky" attribute is not limited to lines and arbitrary geometric objects but may also be applied to lines which touch or overlay other lines or to arbitrary geometric objects which touch or overlay other arbitrary geometric objects. Thus, it will be understood that the invention has application as a CAD interface whenever a user wishes to associate various objects on the display screen thereby facilitating editing and revision of the graphic object file.

Having described my invention, what I desire to protect and secure by Letters Patent is set forth in the following claims:

1. A technique for an interactive computer graphics application which provides the user with a way to attach ends of lines to a graphic object displayed on a screen such that when said graphic object is moved on the screen, the ends of the lines attached to said graphic object will follow the object while other ends of the lines will remain fixed on the screen, said technique comprising the steps of:

selecting a graphic object or the ends of one or more lines on said screen;

providing the selected graphic object or the selected ends of one or more lines with an attribute indicating that ends of lines touching or overlying the graphic object stay attached when the graphic object is moved;

determining if the graphic object is to be moved on said screen;

identifying the ends of lines touching or overlying the graphic object which are to stay attached to said graphic object; and moving the graphic object on the screen while maintaining the identified ends of lines attached to the graphic object while at the same time maintaining other ends of the lines at fixed locations on the screen.

2. The technique recited in claim 1 wherein the step of moving said graphic object is performed by translating, rotating, scaling or stretching said graphic object on said screen.

3. The technique recited in claim 1 wherein the steps of maintaining ends of lines attached to the graphic object while maintaining the other ends of the lines at fixed locations on the screen is performed by drawing the lines on the screen between the ends attached to the graphic object and the ends fixed at locations on the graphics screen.

* * * * *